United States Patent [19]

Crum et al.

[11] Patent Number: 5,685,406
[45] Date of Patent: Nov. 11, 1997

[54] PARK BRAKE ACTUATING MECHANISM FOR A POWER TRANSMISSION

[75] Inventors: Bruce Edward Crum, Pittsboro; Michael Rust Toole, Indianapolis; Thomas Lynn Bishop, Indianapolis; Rayman Eton Bazilio, Indianapolis, all of Ind.

[73] Assignee: General Motors Corporation, Detroit, Mich.

[21] Appl. No.: 692,165

[22] Filed: Aug. 5, 1996

[51] Int. Cl.$^6$ .............................. B60T 1/06; B60K 41/26
[52] U.S. Cl. ..................... 192/4 A; 74/411.5; 188/31
[58] Field of Search ........................... 192/4 A; 74/411.5; 188/31, 69

[56] References Cited

U.S. PATENT DOCUMENTS

| 3,300,001 | 1/1967 | Stockton | 192/4 A |
|---|---|---|---|
| 3,373,850 | 3/1968 | Helmer | 192/4 A |
| 4,907,681 | 3/1990 | Kuusik et al. | 192/4 A |
| 5,295,412 | 3/1994 | Donato et al. | 192/4 A X |

FOREIGN PATENT DOCUMENTS

| 60-82447 | 5/1985 | Japan | 192/4 A |

*Primary Examiner*—Richard M. Lorence
*Attorney, Agent, or Firm*—Donald F. Scherer

[57] ABSTRACT

Power transmissions of the automatic shifting type have a park gear secured with the transmission output shaft such that the operator can select the park position to maintain the vehicle immobile. A park pawl is pivotally mounted within the transmission housing to selectively engage the park gear. Selective engagement and disengagement of the park gear by the park pawl is controlled by the vehicle operator through manipulation of the linearly movable actuator which is connected to an operator controlled detent plate.

5 Claims, 3 Drawing Sheets

PARK BRAKE ACTUATING MECHANISM FOR A POWER TRANSMISSION

TECHNICAL FIELD

This invention relates to park actuators for power transmissions.

BACKGROUND OF THE INVENTION

Power transmissions, particularly planetary gear automatic shifting transmissions, have a park brake mechanism incorporated therein. Generally, these mechanisms include a gear or toothed member secured for rotation with the transmission output shaft, a pawl member pivotally mounted on the transmission casing and an operator controlled actuator.

One typical mechanism is shown in U.S. Pat. No. 2,875,856, issued Mar. 3, 1959, to Mrlik et at. The operator controls the transmission through a manual selector which includes a "rooster comb" or detent plate. The park mechanism has an actuator rod connected between the detent plate and the park pawl. A ramp or cam surface is operable on the pawl to enforce pivoting thereof, such that at least one tooth space of the gear is engaged by the pawl. A lost motion device, such as a spring, permits the manipulation of the detent plate to a "Park" position in the event that an outer tooth surface is engaged and the pawl cannot filly engage the tooth. The lost motion device enforces engagement of the pawl with a tooth space when the gear is rotated slightly and the "Park" position has been selected.

The park mechanism shown in Mrlik et at. functions quite well in conventional vehicle systems. However, larger gross weight vehicles, such as over the road trucks generally need a park mechanism with less friction, particularly during disengagement of the brake. These systems generally use roller mechanisms to reduce the overall friction forces in the system.

SUMMARY OF THE INVENTION

It is an object of the present invention to provide an improved park brake actuator mechanism.

In one aspect of the invention, the park actuator mechanism has roller members to reduce the friction between a reaction pin and a park pawl.

In another aspect of the invention, each roller has a central concave periphery and spaced cylindrical peripheries on either side thereof wherein the cylindrical peripheries are in mutual rolling contact.

In yet another aspect of the invention, the concave periphery on one roller engages a conical ramp on the reaction pin and the cylindrical surfaces on the other roller engage a transversely extending ramp on the pawl member.

DESCRIPTION OF AN EXEMPLARY EMBODIMENTS

The drawings have been reduced in components so that only the necessary elements of the parking mechanism are displayed.

Figure 1:
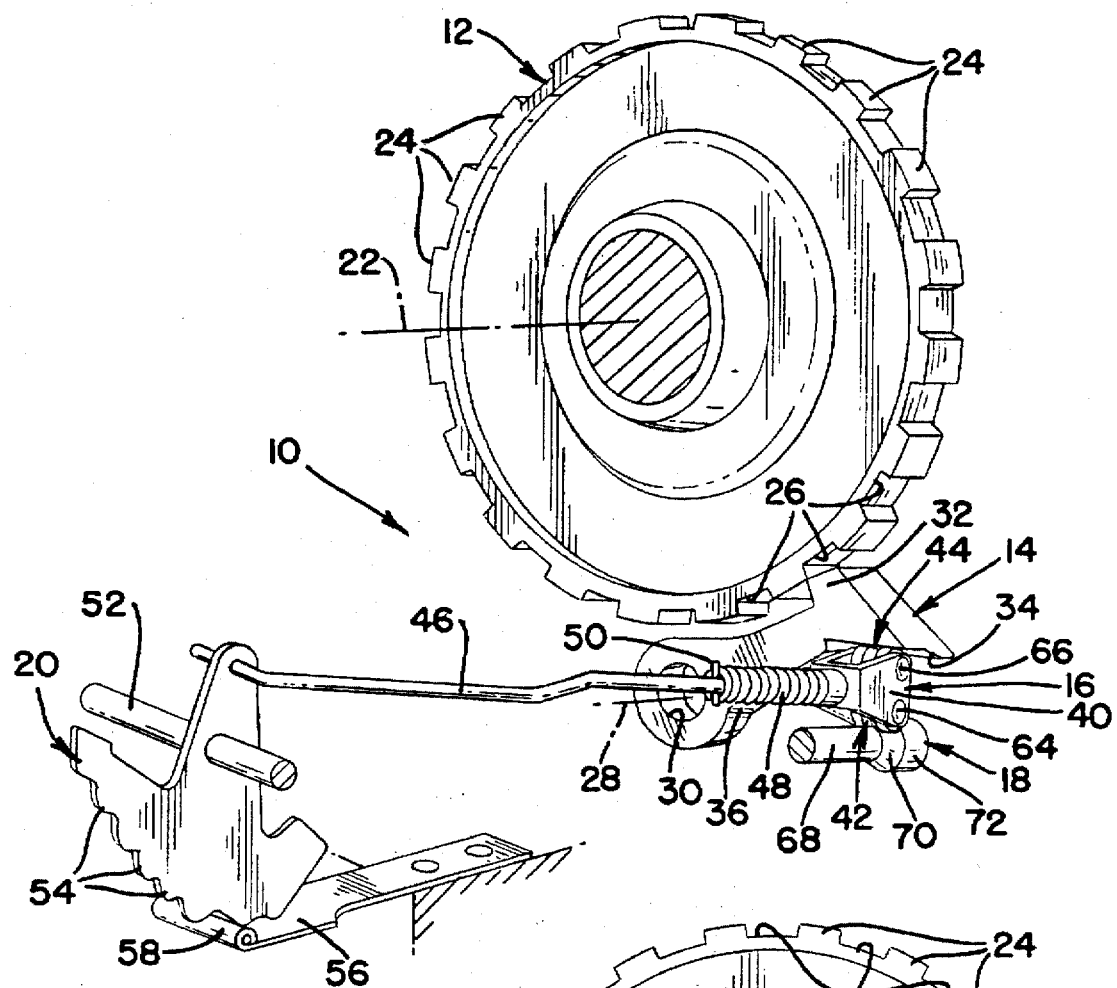
FIG. 1 is an orthogonal view of the components of a parking mechanism in a transmission.

In FIG. 1, the parking mechanism 10 includes a park gear 12, a park pawl 14, an actuator assembly 16, a reaction pin 18 and a rooster comb or detent plate 20. The park gear 12 is rotatably mounted on an axis 22 which is parallel or concentric to the longitudinal axis of the transmission output shaft, not shown. The gear 12 will rotate whenever the output of the transmission is rotated and, when held stationary, will prevent rotation of the transmission output shaft and therefore will prevent movement of the vehicle in which the transmission is disposed.

As is well known, such transmissions have a stationary casing secured to the vehicle and a plurality of gear members which are controlled either automatically or manually by the operator to select a plurality of ratios between the transmission input shaft and vehicle drive wheels such that the engine operating range can be fully utilized to permit startup of the vehicle and cruising speed on highways.

Figure 2:
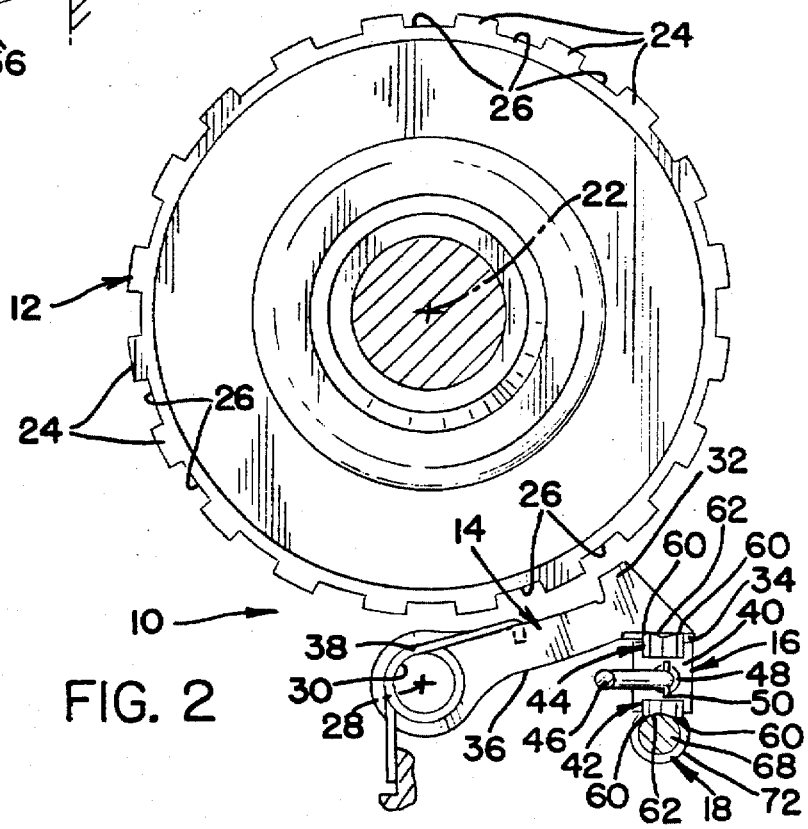
FIG. 2 is an elevational view of a portion of the parking brake mechanism.

The park gear 12 has a plurality of teeth 24 and tooth spaces 26. These teeth 24 and spaces 26 cover the entire periphery of the gear 12. The park pawl 14 is pivotally mounted on a pin or pivot axis 28 and includes an opening or aperture 30 in which a pin is rotatably mounted. The pin, not shown, is supported in the transmission housing. The park pawl 14 further includes a toothed member or portion 32 which is adapted to fit in the tooth space 26 when the pawl 14 is engaged with the gear 12. The pawl 14 has a transverse ramp 34 formed on a longitudinal face 36 opposite to the tooth 32. As best seen in FIG. 2, a torsion spring 38 will surround the pin in the aperture 30 in a manner to displace the tooth 32 out of contact with the park gear 12.

The actuator assembly 16 includes a cage 40 in which a pair of rollers 42 and 44 are mounted. The cage 40 is slidably disposed on a rod 46 and urged into abutment with the longitudinal face 36 of the pawl 14 by a spring 48. One end of the spring 48 abuts the cage 40 and the other end of the spring 48 abuts a pin 50. Thus, the spring 48 affords lost motion between the rod 46 and the cage 40, the reason for which will become apparent later.

The rod 46 is secured to the detent plate 20. The detent plate 20 has secured thereto a pin or rod 52 which is supported in the transmission casing and is rotatable by the vehicle operator through a conventional transmission linkage, not shown. The detent plate 20 has a plurality of detent spaces 54 formed thereon which, as those familiar with the art will recognize, represent the drive positions that are selectable by the operator.

A leaf spring 56 has a rounded or cylindrical end 58 which is urged into abutment with detent spaces 54 to resiliently fix the position of the detent plate 20 as selected by the operator. When the operator rotates the rod 52, the detent plate 20 will also rotate thereby changing the operating position selected. The rod 46 being affixed to the detent plate 20 will move substantially linearly when the detent plate 20 is rotated thereby causing movement of the cage 40.

The rollers 42 and 44 of the actuator assembly 16 each have a pair of cylindrical peripheries or surfaces 60 which are separated by a concave surface 62. The concave surface 62 can be rounded in a curving concave shape or it can be a V-shape concavity. The cylindrical peripheries 60 of roller 44 are disposed to contact the longitudinal surface 36 and ramp 34 of the park pawl 14. The concave surface 62 of the roller 42 is disposed to contact the reaction pin 18. As previously mentioned, the cylindrical surfaces 60 of roller 44 and 42 are in contact with each other thereby reducing any load which might be otherwise transmitted to a pair of pins 64 and 66 which position the rollers 42 and 44, respectively, in the cage 40.

Figure 3:
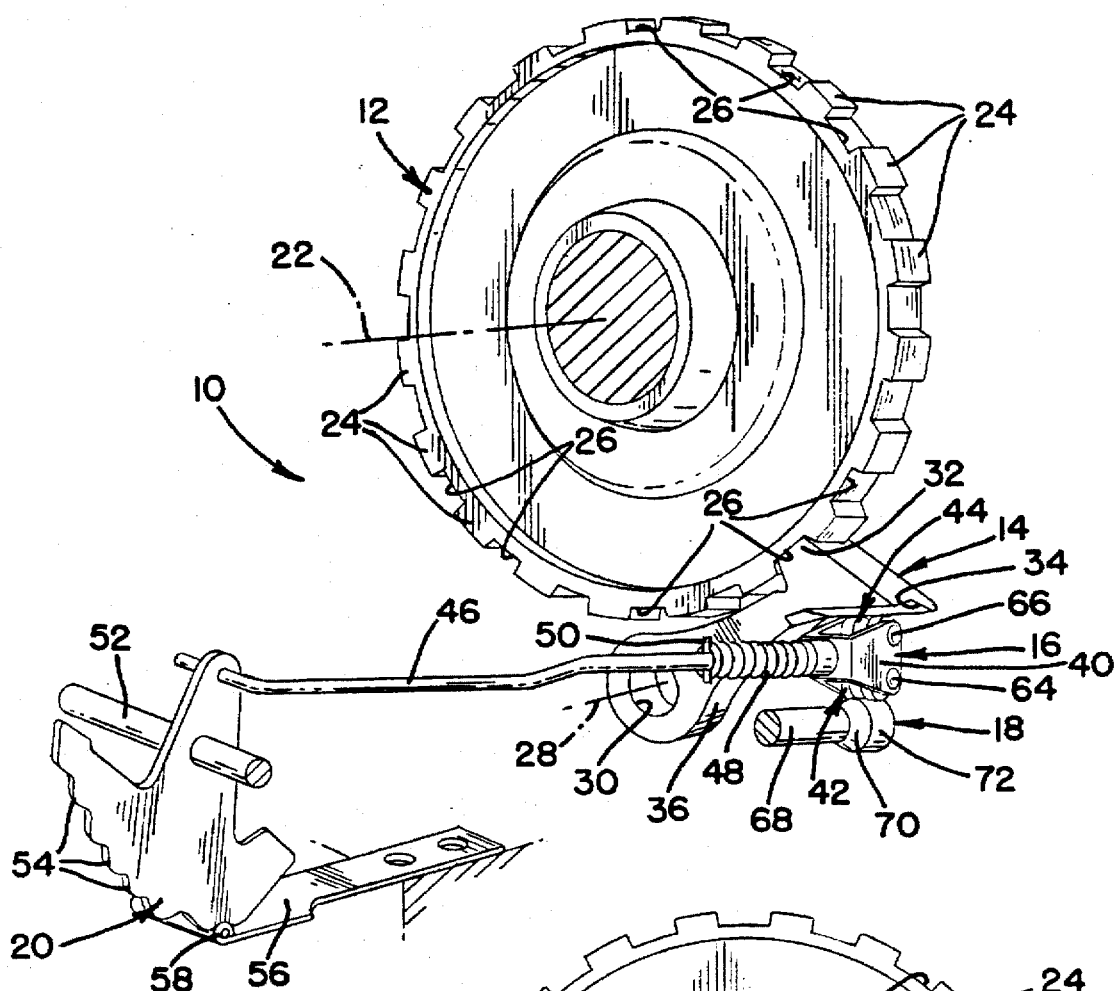
FIG. 3 is a view similar to FIG. 1 showing the parking pawl in the engaged position.
Figure 4:
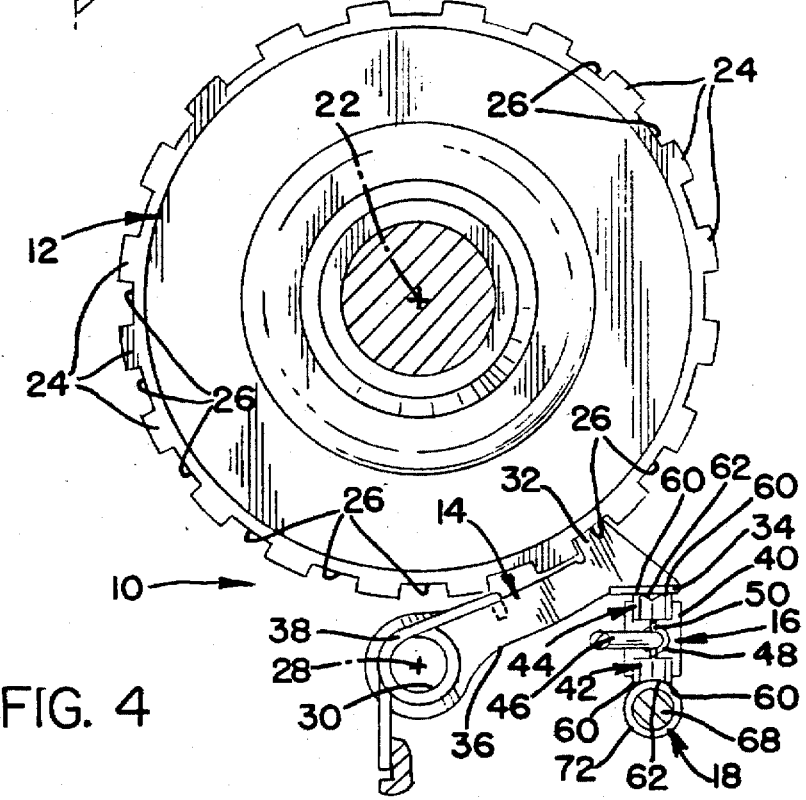
FIG. 4 is a view similar to FIG. 2 showing the parking pawl in the engaged position.

The reaction pin 18 has a cylindrical stem portion 68, a ramp portion 70 and a cylindrical end portion 72. The reaction pin 18 is secured in a conventional manner with the transmission casing. The cylindrical end 72 has a larger diameter than the stem 68, such that the ramp 70 is conical in shape having a larger base portion adjacent the cylindrical end 72. The concave surface 62 of the roller 42 will abut the stem 68 when the parking pawl is in the disengaged position as shown in FIGS. 1 and 2, and will abut the cylindrical end 72 when the parking mechanism is in the park position shown in FIGS. 3 and 4. The ramp 70 and the ramp 34 cooperate with the rollers 42 and 44, respectively, to urge the parking pawl 14 to rotate about the axis 28 and engage with a tooth space 26 of the park gear 12.

As the pawl 14 is driven into engagement with the park gear 12, the cage 40 will rotate slightly on the rod 46 so that the cylindrical surfaces 60 of the roller 44 will remain in contact with the ramp 34 on the longitudinal surface 36. If the cylindrical surfaces 60 do not remain in contact, high end edge loading of the rollers can occur. The cylindrical portions 68 and 72 and the conical ramp 70 accommodate the rotation of the cage 40 about the rod 46 due to the concave surface 62. This arrangement permits the rollers to remain in flat contact with the ramp 34 and with the reaction pin 18 while maintaining only minimal frictional forces in the system.

It should be noted that as the parking actuator assembly 16 is moved toward the parking position, the roller 42 will roll along the reaction pin 18 and the roller 44 will roll along the longitudinal surface 36 and ramp 34. Since these rotations are in opposite directions, the rollers will roll on each other, thus minimal friction occurs during the engagement of the parking pawl 14 with the park gear 12. On disengagement, these rolling motions will also occur, thereby greatly reducing the friction occurred during "pullout" from the park position. As the rollers 42 and 44 descend their respective ramps 70 and 34, the spring 38 will urge the park pawl 14 out of engagement with the park gear 12.

It should also be noted that the park gear tooth 24 and park pawl tooth 32 can be designed to have sufficient angles which will enforce separation of the teeth during disengagement of the park mechanism.

As was mentioned earlier, a number of the more conventional components and park systems have been eliminated from the drawings to provide simplicity and ease of understanding. It will be appreciated by those familiar with the art of transmission design that the ends supporting the park pawl 14 will be rotatably supported or otherwise secured within the stationary portion of the transmission housing as will the reaction pin 18. Also, the transmission output shaft which will be drivingly connected with the park gear 12 will also be rotatably supported within the transmission housing. These design features are not necessary for an understanding of this invention and there are many examples of such mechanisms to be found throughout both the patent literature and the general operator manual literature produced by the automotive companies. Therefore, only the bare essentials of the above exemplary embodiment of the parking mechanism have been shown in the drawings, thus, hopefully providing a clear presentation resulting in improved understanding of the present invention.

Figure 5:
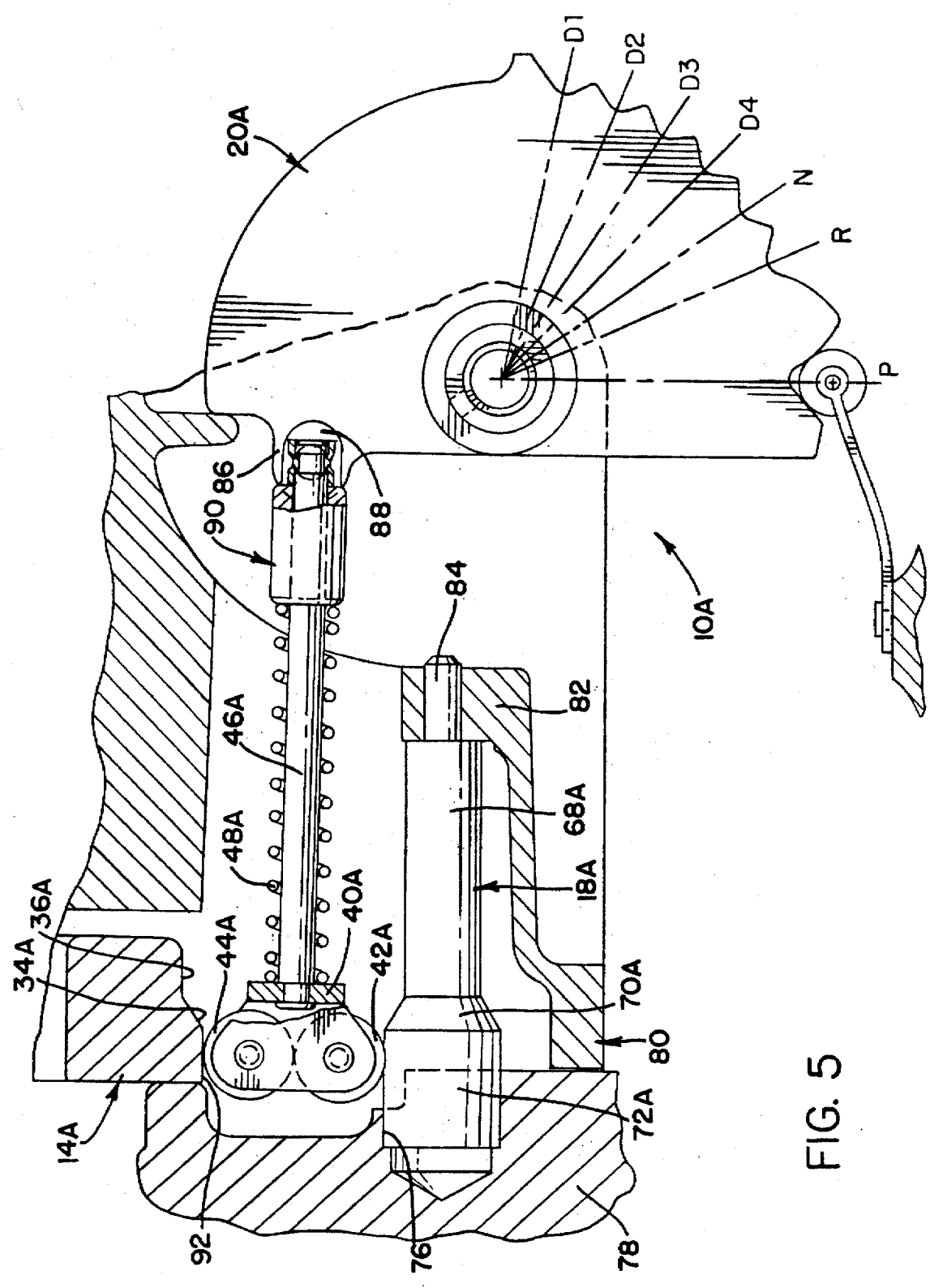
FIG. 5 is an elevational view of another embodiment of the invention.

In an alternative embodiment shown in FIG. 5, corresponding elements have been given the same numerical designation with an "A" suffix. The reaction pin 18A has the cylindrical end portion 72A disposed in a cavity 76 formed in an end cover 78. The end cover 78 is secured to a transmission housing 80. The housing 80 has a ridge 82 in which an extension 84 of the stem 68A is disposed. The reaction pin 18A is secured in place when the end cover 78 is assembled to the housing 80.

The detent plate 20A has an ear 86 in which a stem 88 of a slider 90 is secured. The slider 90 is slidably supported on the rod 46A to compress the spring 48A between itself and the cage 40A.

The park mechanism 10A is shown in the "Park" position represented by P on the detent plate 20A. In this position, the rollers 42A and 44A have traversed the respective ramps 70A and 34A. The concave portion of roller 42A is in abutment with the end 72A of pin 18A and the roller 44A is in abutment with a flat surface 92 formed on the longitudinal surface 36A of the park pawl 14A. Thus, in the "Park" position, the forces between the ramps 70A and 34A and the rollers 42A and 44A have been eliminated. The force on the parking pawl 14A is absorbed by the end cover 78 and housing 80.

When the detent plate 20A is rotated by the operation to one of the other operating positions, the rollers are withdrawn from the park pawl 14A. The pawl 14A will return to the position shown in FIG. 2 under the influence of the return spring and the tooth separating forces.

What is claimed:

1. A parking mechanism with a pawl and an actuator, said mechanism comprising:
    a reaction pin having a longitudinal axis and a substantially conical ramp disposed oblique to the longitudinal axis;
    a pawl pivotally mounted substantially perpendicular to said reaction pin on a pivot axis substantially parallel with and laterally displaced from said longitudinal axis of said reaction pin, a traverse ramp formed on an outer longitudinal surface in a plane oblique to the longitudinal axis of the pin; and
    an actuator supported for linear motion substantially parallel with the longitudinal axis of the pin comprised of a cage and a pair of rollers enclosed within said cage abutting said ramps of said pawl and said reaction pin respectively when the parking pawl is actuated, each said roller having an outer peripheral surface defined by a concave surface and a pair of spaced cylindrical surfaces intersecting the concave surface and cooperating therewith to define the contact surfaces abutting said ramps.

2. A parking mechanism defined in claim 1, wherein said concave surface of said one roller abuts said ramp on said reaction pin.

3. The parking mechanism defined in claim 1, wherein said pair of spaced cylindrical surfaces on one roller contacts said ramp on said pawl.

4. The parking mechanism defined in claim 1, wherein said spaced cylindrical surfaces on one roller are in abutting relation with respective spaced cylindrical surface on another one of said rollers and wherein the concave surfaces of said one roller contact said ramp on said reaction pin.

5. The parking mechanism defined in claim 4, wherein the spaced cylindrical surfaces on said other roller contact said ramp on said pawl.

\* \* \* \* \*